United States Patent
Nerayanuru et al.

(10) Patent No.: US 10,642,243 B2
(45) Date of Patent: May 5, 2020

(54) METHODS AND APPARATUS FOR AN ENCODER

(71) Applicant: SEMICONDUCTOR COMPONENTS INDUSTRIES, LLC, Phoenix, AZ (US)

(72) Inventors: Sreenivasa Murthy Nerayanuru, Phoenix, AZ (US); Jeffrey Dennis Allgood, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 74 days.

(21) Appl. No.: 15/908,931

(22) Filed: Mar. 1, 2018

(65) Prior Publication Data
US 2019/0271961 A1    Sep. 5, 2019

(51) Int. Cl.
| G05B 19/401 | (2006.01) |
| G06F 7/544 | (2006.01) |
| G06F 17/14 | (2006.01) |
| H02K 11/22 | (2016.01) |

(52) U.S. Cl.
CPC ......... *G05B 19/401* (2013.01); *G06F 7/5446* (2013.01); *G06F 17/141* (2013.01); *G05B 2219/37155* (2013.01); *H02K 11/22* (2016.01)

(58) Field of Classification Search
CPC ... G05B 19/401; G06F 7/5446; G06F 17/141; H02K 11/22
USPC .......................................................... 318/602
See application file for complete search history.

(56) References Cited

U.S. PATENT DOCUMENTS

| 5,400,269 | A | * | 3/1995 | White | G01C 19/5607 |
| | | | | | 318/600 |
| 5,482,044 | A | | 1/1996 | Lin | |
| 6,178,210 | B1 | * | 1/2001 | Craig | H04H 20/67 |
| | | | | | 375/293 |
| 6,282,248 | B1 | * | 8/2001 | Farrow | H04L 7/0029 |
| | | | | | 329/304 |
| 6,754,479 | B1 | * | 6/2004 | Hughes | H03G 3/3068 |
| | | | | | 375/345 |
| 7,136,431 | B2 | * | 11/2006 | Shi | H04L 25/062 |
| | | | | | 375/319 |
| 7,873,493 | B2 | * | 1/2011 | Tenten | G01B 21/22 |
| | | | | | 318/479 |
| 9,904,311 | B1 | * | 2/2018 | Cristofoli | G06F 1/022 |
| 9,979,573 | B1 | * | 5/2018 | Marrow | G06F 7/4818 |
| 10,132,649 | B2 | * | 11/2018 | Janisch | G01D 5/145 |
| 2004/0251911 | A1 | | 12/2004 | Nowok | |
| 2005/0117166 | A1 | * | 6/2005 | Nozu | G01B 11/14 |
| | | | | | 356/507 |
| 2006/0066290 | A1 | | 3/2006 | Hausdorf | |

(Continued)

FOREIGN PATENT DOCUMENTS

CN      104483549 A    4/2015

*Primary Examiner* — Kawing Chan
(74) *Attorney, Agent, or Firm* — The Noblitt Group, PLLC; Hettie L. Haines

(57) ABSTRACT

Various embodiments of the present technology comprise a method and apparatus for an encoder. In various embodiments, the encoder is configured to remove impairments from the signals produced by a servo motor and compute a phase that is used to determine the rotary position of the servo motor. In various embodiments, the encoder is configured to remove a DC offset, improve amplitude mismatch, and compute a phase offset.

19 Claims, 10 Drawing Sheets

(56) References Cited

U.S. PATENT DOCUMENTS

| | | | |
|---|---|---|---|
| 2006/0269004 A1 | 11/2006 | Ibrahim | |
| 2010/0057392 A1* | 3/2010 | York | G01D 5/24476 |
| | | | 702/94 |
| 2012/0320381 A1* | 12/2012 | Okada | G01B 9/02059 |
| | | | 356/484 |
| 2015/0022916 A1* | 1/2015 | Zou | G11B 5/455 |
| | | | 360/31 |
| 2015/0145764 A1* | 5/2015 | Hiromi | G06F 3/0304 |
| | | | 345/156 |
| 2015/0326255 A1* | 11/2015 | Dally | H03K 3/45 |
| | | | 375/297 |
| 2016/0056737 A1* | 2/2016 | White | G05D 19/02 |
| | | | 318/400.02 |
| 2016/0142817 A1 | 5/2016 | Hotehama | |
| 2016/0373125 A1* | 12/2016 | Pagnanelli | H03M 3/404 |
| 2017/0219665 A1* | 8/2017 | Alpago | G01R 33/077 |
| 2017/0328712 A1* | 11/2017 | Collin | G01C 19/5726 |

\* cited by examiner

METHODS AND APPARATUS FOR AN ENCODER

BACKGROUND OF THE TECHNOLOGY

The rotary position of a servo motor is generally determined with the use of a processing circuit, a light source, such as light emitting diodes (LEDs), a photo detector, and a disc with slots (the combination of these is generally referred to as an optical encoder). The LEDs project light onto the disc as the motor rotates producing an optical pattern that is detected by the photo detector. The photo detector produces signals representing the optical pattern, which are then transmitted to a processing circuit that computes the rotary position of the motor. The accuracy of the encoder affects the accuracy of the servo motor itself. In many applications, knowing the position of the servo motor with a great deal of accuracy is desired. Impairments in the servo motor signals, however, present challenges in computing the position with accuracy. Such impairments may include phase offsets, DC offsets, and/or mismatched amplitudes between two photo detector signals. Conventional systems are not sufficiently accurate to compute the servo motor position when these impairments are present.

SUMMARY OF THE INVENTION

Various embodiments of the present technology comprise a method and apparatus for an encoder. In various embodiments, the encoder is configured to remove impairments from the signals produced by a servo motor and compute a phase that is used to determine the rotary position of the servo motor. In various embodiments, the encoder is configured to remove a DC offset, improve amplitude mismatch, and compute a phase offset.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various servo motors, controllers, drive circuits, amplifiers, signal converters, and the like, which may carry out a variety of functions. In addition, the present technology may be practiced in conjunction with any number of systems, such as automation, robotics, computer numerical control (CNC) machinery, and the like, and the systems described are merely exemplary applications for the technology. Further, the present technology may employ any number of conventional techniques for sampling a signal, decimation, computing a frequency, extrapolation, and the like.

Figure 1:
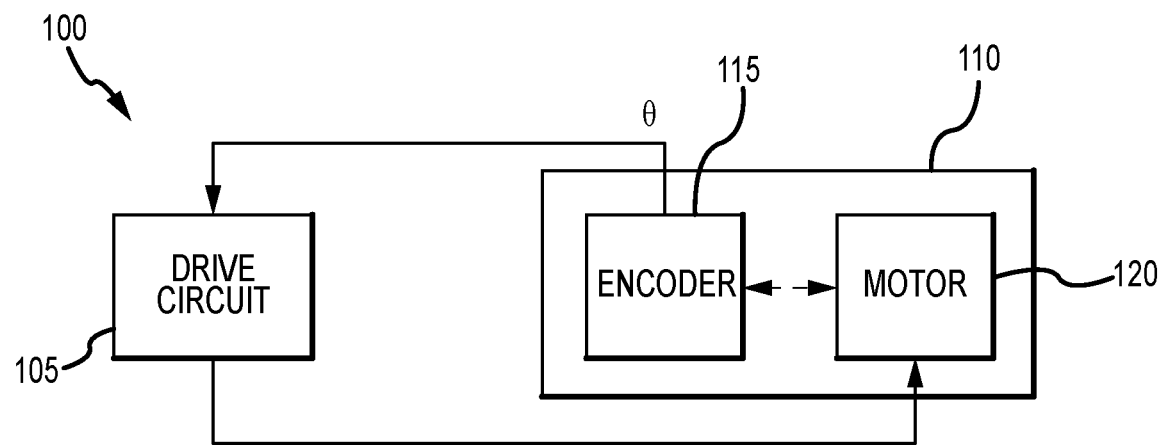
FIG. 1 is a block diagram of a servo motor system in accordance with an exemplary embodiment of the present technology.

Methods and apparatus for an encoder according to various aspects of the present technology may operate in conjunction with any suitable system, such as an automation system, and the like. Referring to FIG. 1, an exemplary servo motor system 100 may be incorporated into an automation system where a high level of precision and versatility are desired. For example, in various embodiments, the servo motor system 100 may comprise a drive circuit 105 and a servo motor assembly 110, comprising a motor 120 and an encoder circuit 115, that operate together to precisely detect and control a rotary position (i.e., angular position) of the motor 120.

The drive circuit 105 is configured to drive and/or control the motor 120 according to various input signals. For example, the drive circuit 105 may be coupled to and configured to receive a signal from the encoder circuit 115, such as a signal related to the rotary position of the motor 120 and/or a direction of rotation of the motor 120. The drive circuit 105 may reposition the motor 120 and/or change the direction of rotation in response to the signal from the encoder circuit 115. The drive circuit 105 may comprise various logic circuits, memory components, sensors, signal converters, and the like. The drive circuit 105 may be further configured to synchronize various signals, such as the signals related to the rotary position of the motor 120, acceleration, speed, and other relevant parameters. For example, the drive circuit 105 may receive or generate a clock signal used to synchronize the relevant signals and/or request information related to the rotary position of the motor 120, acceleration, speed, and other relevant parameters from the encoder 115 via command signals.

The motor 120 is responsive to the drive circuit 105 and may change its rotary position according to a control signal from the drive circuit 105. In an exemplary embodiment, the motor 120 comprises a servo motor or other suitable motor.

The motor 120 may be coupled to and receive the control signal from the drive circuit 105, wherein the control signal represents a desired rotational direction and rotary position of the motor 120.

The encoder circuit 115 detects the rotational movement of the motor 120 and generates a phase θ, where θ=2πft, and f is a frequency and t is time. The encoder circuit 115 may then utilize the phase θ along with other relevant variables to compute to the rotary position of the motor 120. For example, in one embodiment, the encoder circuit 115 may utilize a turn count of the motor 120, a number of cycles per revolution (e.g., 1024 cycles/revolution), a current cycle count, and the phase θ. In an exemplary embodiment, the rotary position may be expressed as follows: position=(turn count)×(cycles per revolution)+(current cycle count)+θ. In an alternative embodiment, the driver circuit 105 may be configured to compute the position according to the equation above.

In an exemplary embodiment, the encoder circuit 115 may be coupled to the motor 120 and configured to generate various signals to compute the phase θ and determine the rotary position of the motor 120. For example, the encoder circuit 115 may comprise an optical circuit configured to generate a first signal A, with positive and negative components (i.e., $A_{POS}$, $A_{NEG}$) on a first channel (Channel A), and a second signal B, with positive and negative components (i.e., $B_{POS}$, $B_{NEG}$) on a second channel (Channel B) according to light absorbed by a photo detector (not shown), wherein the first and second signals A, B are sinusoidal signals. Ideally, if the positive component of the first signal $A_{POS}$ equals 0 degrees, the negative component of the first signal $A_{NEG}$, in relation to $A_{POS}$, equals 180 degrees, the positive component of the second signal $B_{POS}$, in relation to $A_{POS}$, equals 90 degrees, and the negative component of the second signal $B_{NEG}$, in relation to $A_{POS}$, equals 270 degrees to generate differential sine and cosine signals.

The encoder circuit 115 may utilize the first and second signals A, B to compute the phase θ. The encoder circuit 115 may be electrically coupled to the drive circuit 105 and may be configured to transmit the phase θ to the drive circuit 105. In an exemplary embodiment, and referring now to FIG. 2, the encoder circuit 115 may comprise a first correction circuit 200, a second correction circuit 225, and a signal processing circuit 230. In various embodiments, the encoder circuit 115 may further comprise a signal conversion circuit 235 comprising a multiplexer 205, a buffer 210, an analog-to-digital converter 215, and a demultiplexer 220. In an exemplary embodiment, the signal conversion circuit 235 components may be electrically connected in series and connected between an output terminal of the first correction circuit 200 and an input terminal of the second correction circuit 225.

In various embodiments, the multiplexer 205 and the buffer 210 may be implemented as a signal sample and hold buffer circuit, wherein each input signal, such as the first and second signals A, B, is sampled simultaneously and then serially converted to a digital signal.

In an ideal case, the first and second signals A, B are expected to be in quadrature (i.e., 90 degrees in phase), in which the ideal signals may be expressed as follows:

Channel A: $I_{ideal}(t) = A \cos(2\pi f t)$ (Equation 1)

Channel B: $Q_{ideal}(t) = A \sin(2\pi f t)$ (Equation 2)

Where A is the amplitude, f is the frequency, which is directly related to the rotation of the motor 120, and t is the sampling time, and where $t=n/f_s$, where n=0, 1, 2, ..., ∞, and $f_s$ is a sampling frequency. In the ideal case, the amplitude of the first channel is the same as the amplitude of the second channel.

The first and second signals A, B, however, may suffer from various impairments, such as phase offset, DC offsets, and amplitude mismatch. In an actual (non-ideal) case, the first and second signals A, B may be expressed as follows:

$$\text{Channel A: } I_{actual}(t) = A_I \cos\left(2\pi f t + \frac{\Phi_{off}}{2}\right) + I' \quad \text{(Equation 3)}$$

$$\text{Channel B: } Q_{actual}(t) = A_Q \sin\left(2\pi f t - \frac{\Phi_{off}}{2}\right) + Q' \quad \text{(Equation 4)}$$

Where $A_I$ and $A_Q$ are the amplitudes of the first and second signals, respectively, where $A_I \neq A_Q$, $\Phi_{off}$ is a phase offset from the ideal 90 difference between the first and second signals, and I' and Q' are the DC offsets on each of the first and second signals, where I'≠0 and Q'≠0. Conventional systems are unable to precisely compute the phase θ, and thus the rotary position of the motor 120 when such impairments are present.

Figure 3:
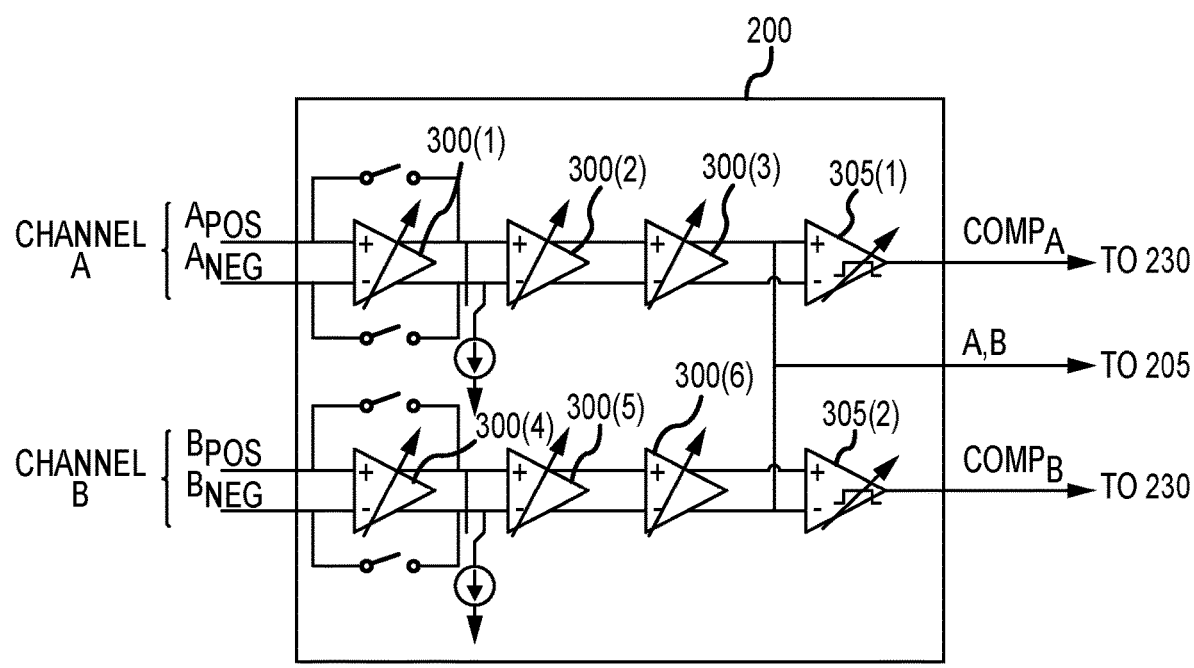
FIG. 3 is a circuit diagram of an analog circuit for applying a fixed gain and correcting a DC offset in accordance with an exemplary embodiment of the present technology.

Referring to FIG. 3, the first correction circuit 200 may be configured to receive the first and second signals A, B and apply a fixed gain to each signal and provide a DC offset correction to each. For example, the first correction circuit 200 may comprise a plurality of amplifiers 300(1):300(6) and a plurality of comparators 305(1),305(2). In an exemplary embodiment, a subset of the plurality of amplifiers, such as first, second, and third amplifiers 300(1):300(3) may be configured to receive the first input signals $A_{POS}$, $A_{NEG}$ and coupled in series with a first comparator 305(1). The first amplifier 300(1) may be configured to convert a current to a voltage, the second amplifier 300(2) may be configured to provide DC offset and coarse gain correction, and the third amplifier 300(3) may be configured to provide fine gain correction. The first comparator 305(1) may generate a first comparator signal $COMP_A$.

The remaining subset of the plurality of amplifiers, such as fourth, fifth, and sixth amplifiers 300(4):300(6) may be configured to receive the second input signals $B_{POS}$, $B_{NEG}$ and coupled in series with a second comparator 305(2). Similarly, the fourth amplifier 300(4) may be configured to convert a current to a voltage, the fifth amplifier 300(5) may be configured to provide DC offset and coarse gain correction, and the sixth amplifier 300(6) may be configured to provide fine gain correction. The second comparator 305(2) may generate a second comparator signal $COMP_B$.

The first correction circuit 200 may transmit the first and second signals A, B to the signal conversion circuit 235 for further processing. In an exemplary embodiment, the first and second signals A, B output from the first correction circuit 200 have undergone some correction, but may still suffer from some impairments.

Figure 4:
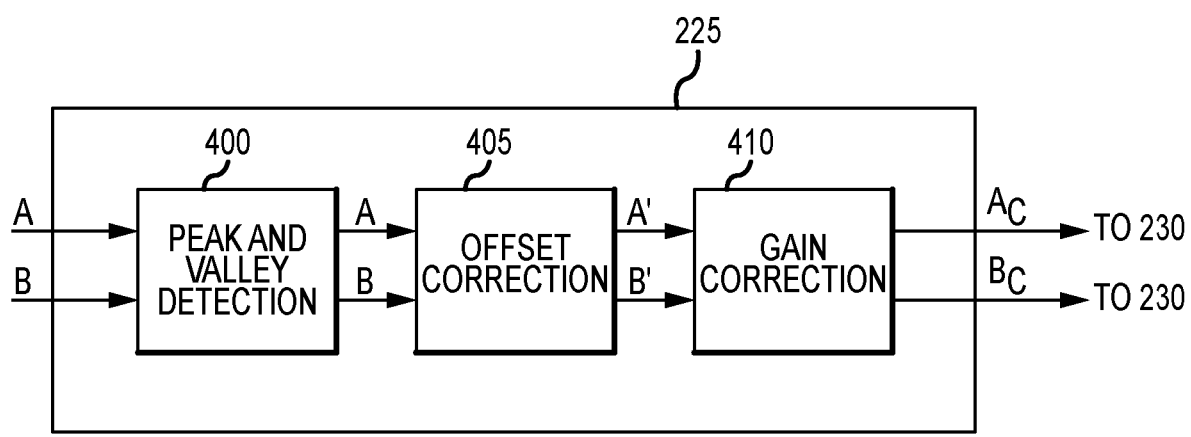
FIG. 4 is a block diagram of a digital circuit for applying a dynamic gain and correcting a DC offset in accordance with an exemplary embodiment of the present technology.

Referring now to FIG. 4, the second correction circuit 225 may be configured to apply a dynamic gain to the first and second signals A, B received from the signal conversion circuit 235, and correct a DC offset of the first and second signals A, B, and generate corrected first and second signals A, B. For example, the second correction circuit 225 may comprise a peak and valley detection circuit 400, a DC offset correction circuit 405, and a gain correction circuit 410. In an exemplary embodiment, the peak and valley detection circuit 400 receives the first and second signals A, B from the signal conversion circuit 235 and is configured to detect a minimum amplitude and a maximum amplitude of each of the first and second signals A, B. The first and second signals A, B may then be transmitted to the offset correction circuit 405, wherein the offset correction circuit 405 corrects a DC offset between the first and second signals A, B to generate a first corrected first signal A' and a first corrected second signal B'. The first corrected first and second signals A', B' may then be transmitted to the gain correction circuit 410, wherein in the gain correction circuit 410 applies a dynamic gain to each. The gain correction circuit 410 may then output second corrected first and second signals $A_C$, $B_C$ to the signal processing circuit 230 for further processing. The second corrected first and second signals $A_C$, $B_C$ are free from amplitude mismatch and DC offsets, described with respect to Equations 3 and 4. In other words, the amplitudes $A_I$, $A_Q$ of the corrected first and second signals $A_C$, $B_C$ are equal (i.e., $A_I = A_Q$), and the DC offsets I' and Q' are removed (i.e., I'=Q'=0).

Figure 5:
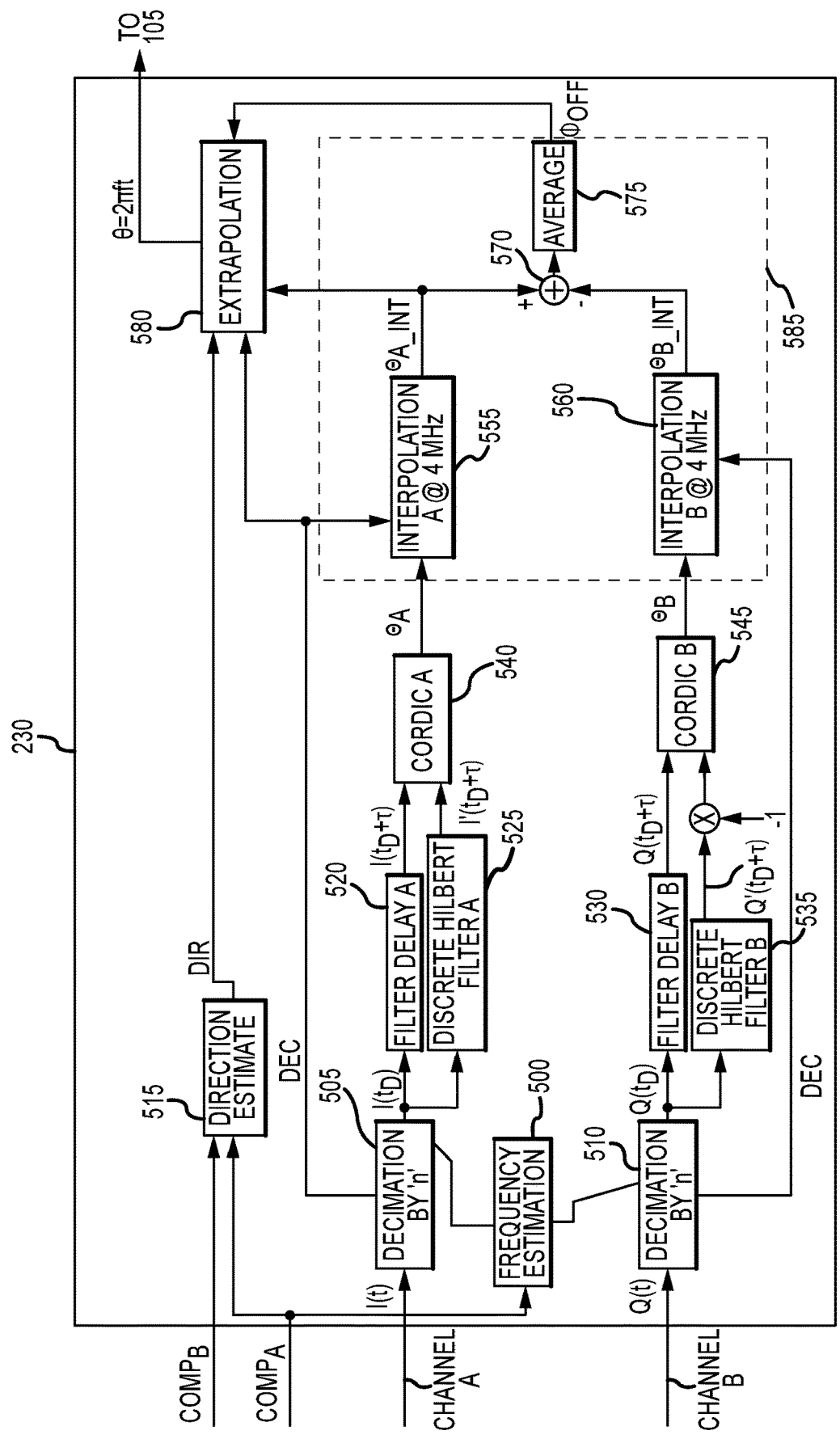
FIG. 5 is a block diagram of a signal processing circuit in accordance with an exemplary embodiment of the present technology.

Referring now to FIG. 5, the signal processing circuit 230 may be configured to receive the corrected first and second signals $A_C$, $B_C$ and utilize the first and second channel data to compute the phase θ. According to the present technology, the signal processing circuit 230 is configured to compute a quadrature of a signal on Channel A (a first channel signal), such as the first signal A or the corrected first signal $A_C$, and a quadrature of a signal on Channel B (a second channel signal), such as the second signal B or the corrected second signal $B_C$, compute the phase offset $\Phi_{off}$ between the two input signals, and to precisely compute the phase θ according to the phase offset $\Phi_{off}$, a first interpolated signal $\Theta_{A\_INT}$, and a decimation value DEC.

For example, the signal processing circuit 230 may comprise a frequency estimation circuit 500, a direction circuit 515, a first decimator 505, a second decimator 510, a first delay circuit 520, a second delay circuit 530, a first filter 525, a second filter 535, a first phase estimation circuit 540, a second phase estimation circuit 545, a phase offset circuit 585, and an extrapolator 580. According to various embodiments, the first decimator 505 may be identical to the second decimator, and the first delay circuit 520 may be identical to the second delay circuit 530.

In an exemplary embodiment, the first channel signal is fed into an input terminal of the first decimator 505. An output terminal of the first decimator 505 is connected to an input terminal of the first delay circuit 520 as well as an input terminal of the first filter 525. An output terminal of the first delay circuit 520 is connected to a first input terminal of the first phase estimation circuit 540, and an output terminal of the first filter 525 is connected to a second input terminal of the first phase estimation circuit 540. An output terminal of the first phase estimation circuit 540 is connected to a first input terminal of the phase offset circuit 585. Similarly, the second channel signal is fed into an input terminal of the second decimator 510. An output terminal of the second decimator 510 is connected to an input terminal of the second delay circuit 530 as well as an input terminal of the second filter 535. An output terminal of the second delay circuit 530 is connected to a first input terminal of the second phase estimation circuit 545, and an output terminal of the second filter 535 is connected to a second input terminal of the second phase estimation circuit 545. An output terminal of the second phase estimation circuit 545 is connected to a second input terminal of the phase offset circuit 585.

In an alternative embodiment, the output terminals of the second correction circuit 225 may be multiplexed to the input terminals of the first phase estimation circuit 540. In a case where the motor 120 is operating at a low speed (i.e., a decimation ratio is high), for example for speeds ranging from 0.089 Hz to 0.18 Hz and having a decimation ratio of 2,097,152:1, the first delay circuit 520 and the first filter 525 may be bypassed and the corrected first signal $A_C$ and the corrected second signal $B_C$ may be transmitted directly to the first phase estimation circuit 540. In the present case, the second phase estimation circuit 545 is not used. For example, for Channel A, the signal processing circuit 230 may comprise a first switch (not shown), or other suitable device, coupled at a first output terminal of the second correction circuit 225. The first switch may operate to selectively couple the first output terminal of the second correction circuit 225 to the first phase estimation circuit 540 or to the first decimator 505. Similarly, for Channel B, the signal processing circuit 230 may comprise a second switch (not shown), or other suitable device, coupled at a second output terminal of the second correction circuit 225. The second switch may operate to selectively couple the second output terminal of the second correction circuit 225 to the first phase estimation circuit 540 or to the second decimator 510.

The frequency estimation circuit 500 may be configured to compute a frequency f. In an exemplary embodiment, the frequency estimation circuit 500 is configured to compute the frequency f based on zero crossings in the first channel signal compared to a high frequency phase-locked loop (PLL) clock. In alternative embodiments, however, the frequency f may be computed using any suitable method or technique. The frequency estimation circuit 500 may be coupled to receive the first comparator signal $COMP_A$, which provides the zero crossings of the first signal to the frequency estimation circuit 500. In an exemplary embodiment, the frequency estimation circuit 500 may transmit the computed frequency f to the first and second decimators 505, 510.

The direction circuit 515 may be configured to compute the direction of rotation of the motor 120 and generate a direction signal DIR that represents the direction of rotation. In an exemplary embodiment, the direction circuit 515 may be configured to receive the first comparator signal $COMP_A$ and the second comparator signal $COMP_B$, and determine the direction of rotation according to a sign (i.e., +/−) of the first comparator signal $COMP_A$. In alternative embodiments, the direction circuit 515 may utilize any suitable signals and/or parameters to determine the direction of rotation. The direction circuit 515 may comprise any circuit and/or system suitable for computing the direction of rotation of the motor 120.

The first and second decimators 505, 510 may be configured to perform decimation of a signal and allows the first and second filters 525, 535 to operate at an extended range of frequencies, such as from 2 MHz to 0.089 Hz. The upper and lower limits of the range may be adjusted by increasing the sampling rate and/or increasing the decimation ratio. For example, the first decimator 505 receives the first channel signal and generates a first decimated signal $I(t_D)$. The first decimator 505 may transmit the first decimated signal $I(t_D)$ to both the first delay circuit 520 and the first filter 525. The first decimated signal $I(t_D)$ may be expressed as follows:

$$\text{Channel A: } I(t_D) = A_I \cos\left(2\pi f t_D + \frac{\Theta_{off}}{2}\right) + I', \quad \text{(Equation 5)}$$

where a sampling rate $t_D$ is expressed as:

$$t_D = \frac{n \times 2^D}{f_s},$$

where $f_s$ is a sampling frequency, $n=0, 1, 2, \ldots, \infty$; and $D=0, 1, \ldots, m$ (the decimation value DEC).

Similarly, the second decimator 510 receives the second channel signal and generates a second decimated signal $Q(t_D)$. The second decimator 510 may transmit the second decimated signal $Q(t_D)$ to both the second delay circuit 530 and the second filter 535. The second decimated signal $Q(t_D)$ may be expressed as follows:

$$\text{Channel } B: Q(t_D) = A_Q \sin\left(2\pi f t_D - \frac{\Theta_{\mathit{off}}}{2}\right) + Q', \quad \text{(Equation 6)}$$

where:

$$t_D = \frac{n \times 2^D}{f_s}, n = 0, 1, 2, \ldots, \infty, \text{ and}$$

$$D = 0, 1, 2, \ldots, m.$$

According to an exemplary application, a decimation factor is equal to powers of 2 (i.e., $2^D$, where D is the decimation value (DEC)). The decimation factor may be adjusted according to the particular application and/or system. According to various embodiments, each of the first and second decimators 505, 510 may further generate and transmit the decimation value DEC to the phase estimation circuit 585. The phase estimation circuit 585 may utilize the decimation value DEC to determine the sampling frequency f. For example, for a decimation value of 1, the sampling frequency f is 4 MHz, for a decimation value of 2, the sampling frequency f is 2 MHz, and for a decimation value of 4, the sampling frequency f is 1 MHz.

The first and second delay circuits 520, 530 introduce a time delay τ to each of the first decimated signal $I(t_D)$ and the second decimated signal $Q(t_D)$ so that the signals time-align with output signals of the first and second filters 525, 535. The first delay circuit 520 may generate a first delayed signal $I(t_D+\tau)$ represented as follows:

$$I(t_D + \tau) = A_I \cos\left(2\pi f(t_D + \tau) + \frac{\Phi_{\mathit{off}}}{2}\right) + I', \quad \text{(Equation 7)}$$

where:

$$\tau = \frac{\left(\frac{N}{2}+1\right) \times 2^D}{f_s},$$

$N$ = number of taps of the first filter 525, and the second delay circuit 530 may generate a second delayed signal $Q(t_D+\tau)$ represented as follows:

$$Q(t_D + \tau) = A_Q \sin\left(2\pi f(t_D + \tau) - \frac{\Phi_{\mathit{off}}}{2}\right) + Q', \quad \text{(Equation 8)}$$

where:

$$\tau = \frac{\left(\frac{N}{2}+1\right) \times 2^D}{f_s},$$

$N$ = number of taps of the second filter 535.

In an exemplary embodiment, the number of taps N of the first filter 525 is equal to the number of taps N of the second filter. For example, the number of taps N=128, and each tap is 16 bits. The time delay τ may be equal to an inherent time delay of the first and second filters 525, 535. The first and second delay circuits 520, 530 may comprise any circuit and/or device suitable for introducing a time delay, such as a delay filter.

The first and second filters 525, 535 transform an input signal to produce a new signal. For example, the first filter 525 receives and transforms a cosine signal into a sine signal. For example, the first filter 525 transforms the first decimated signal $I(t_D)$ (a cosine signal—see Equation 5 above) to produce a first transformed signal $I'(t_D+\tau)$ (a sine signal) represented as follows:

$$I'(t_D + \tau) = A_I \sin\left(2\pi f(t_D + \tau) + \frac{\Phi_{\mathit{off}}}{2}\right). \quad \text{(Equation 9)}$$

Similarly the second filter 535 receives and transforms a sine signal into a cosine signal. For example, the second filter transforms the second decimated signal $Q(t_D)$ (a sine signal—see Equation 6) to produce a second transformed signal $Q'(t_D+\tau)$ (a cosine signal) represented as follows:

$$Q'(t_D + \tau) = -A_Q \cos\left(2\pi f(t_D + \tau) - \frac{\Phi_{\mathit{off}}}{2}\right). \quad \text{(Equation 10)}$$

The first filter 525 transmits the first transformed signal $I'(t_D+\tau)$ to the first phase estimation circuit 540 and the second filter 535 transmits the second transformed signal $Q'(t_D+\tau)$, multiplied by −1, to the second phase estimation circuit 545. The first and second filters 525, 535 may comprise any circuit and/or system suitable for transforming a signal. In an exemplary embodiment, each of the first and second filters 525, 535 comprise a Discrete Hilbert Transform (DHT) filter implemented using a 128 tap, fixed length Finite Impulse Response filter. The number of taps may be chosen based on the particular application or other relevant parameters. It should be noted that, in the exemplary embodiment, the filter is anti-symmetric. Because of this anti-symmetry, a DC component in the frequency response of each filter is zero (i.e., the outputs of each filter will not have a DC value). In addition, alternate taps are equal to zero, so only 64 taps are implemented, while the zero taps are ignored. Each filter 525, 535 processes the data at a rate of $f_s/2^D$. Accordingly, the first and second filters 525, 535 are able to operate in a broad range of frequencies, such as from 0.089 Hz to 2 MHz.

The first phase estimation circuit 540 computes a first phase $\Theta_A$ of the input signal, such as I(t), according to the first transformed signal $I'(t_D+\tau)$ and the first delayed signal $I(t_D+\tau)$. The first phase ΘA may be described as follows:

$$\text{Channel } A: \Theta_A = 2\pi f(t_D + \tau) + \frac{\Phi_{\mathit{off}}}{2}. \quad \text{(Equation 11)}$$

Similarly, the second phase estimation circuit 545 computes a second phase $\Theta_B$ of an input signal, such as Q(t), according to the second transformed signal $Q'(t_D+\tau)$ and the second delayed signal $Q(t_D+\tau)$. The second phase $\Theta_B$ may be described as follows:

Channel B: $\Theta_B = 2\pi f(t_D + \tau) - \frac{\Phi_{off}}{2}$. (Equation 12)

Equations 11 and 12 assume that there is no DC offset on either channel. In an exemplary embodiment, the first and second phase estimation circuits 540, 545 may be configured to compute the first and second phases utilizing a Coordinate Rotation Digital Computer (CORDIC) algorithm. In alternative embodiments, other techniques and/or methods may be implemented, such as Taylor series, a look-up table, or Padé approximation. When implemented in hardware, the CORDIC algorithm may be preferred due to the smaller footprint of the chip and/or because the chip requires less memory than other methods, for example the look-up table.

The phase offset circuit 585 computes the phase offset $\Phi_{off}$ (from an ideal 90 degree difference) between two signals. In an exemplary embodiment, the phase offset circuit 585 computes the phase offset $\Phi_{off}$ between the first phase $\Theta_A$ and the second phase $\Theta_B$. For example, the phase offset circuit 585 may comprise a first interpolator 555, a second interpolator 560, an adder 570, and an averaging circuit 575 that operate together to compute the phase offset (Doff.

The first and second interpolators 555, 560 may be configured to construct a new data point within a range of a discrete set of known data points. For example, each interpolator may be designed to produce a phase estimate at a particular sampling frequency $f_s$, such as 4 MHz. In an exemplary embodiment, the first interpolator 555 receives the first phase $\Theta_A$ and generates the first interpolated signal $\Theta_{A\_INT}$:

Channel A: (Equation 13)

$\Theta_{A\_INT} = 2\pi f(t_D + \tau) + \frac{\Phi_{off}}{2} + k \times \theta_{step}$, where:

$\theta_{step} = \frac{2\pi f}{2^D}$;

$t_D = \frac{n \times 2^D}{f_z}$;

$n = 0, 1, 2, \ldots, \infty$;

$D = 0, 1, 2, \ldots, m$;

$k = 0, 1, 2, \ldots, (2^D - 1)$;

$t = \frac{1}{f_s}$; and $\tau = \frac{\left(\frac{N}{2} + 1\right) \times 2^D}{f_s}$.

Therefore:

Channel A: $\Theta_{A\_INT} = 2\pi f(t + \tau) + \frac{\Phi_{off}}{2}$.

Similarly, the second interpolator 560 receives the second phase $\Theta_B$ and generates a second interpolated signal $\Theta_{B\_INT}$:

Channel B: (Equation 14)

$\Theta_{B\_INT} = 2\pi f(t_D + \tau) - \frac{\Phi_{off}}{2} + k \times \theta_{step}$.

Therefore:

Channel B: $\Theta_{B\_INT} = 2\pi f(t + \tau) - \frac{\Phi_{off}}{2}$.

The adder circuit 570 then takes the difference between the first phase and the second phase. Over a period of time, the phase estimation circuit 585 receives some number of signals and the averaging circuit 575 averages the values of these signals over that period of time to produce the phase offset $\Phi_{off}$.

The extrapolator 580 may compute the phase θ, where θ=2πft. The extrapolator may also remove any time delays that were introduced by the first delay circuit 520 and/or the first filter 525 The extrapolator 580 may be configured to receive the first phase $\Theta_A$, the phase offset $\Phi_{off}$, the decimation value DEC, and the direction signal DIR. The extrapolator 580 may utilize these variables to compute the phase θ, acceleration, and/or a change in the rotary position of the motor 120 over a period of time. For example, the extrapolator 580 may compute the product of 2πfτ and then subtract that from the first phase $\Theta_A$. The extrapolator 580 may further subtract the phase offset $\Phi_{off}$ divided by 2 ($\Phi_{off}/2$), which provides the phase θ (where θ=2πft). The extrapolator 580 may then transmit the phase θ to the drive circuit 105. The extrapolator 580 may comprise any circuit and/or system suitable for performing computations, such as a programmable device or an application-specific integrated circuit.

According to various embodiments, the encoder circuit 115 operates to remove various impairments in the output signals produced by the photodetectors and compute the phase θ. Such impairments may comprise phase offsets, DC offsets, and/or mismatched amplitudes between the output signals of two photodetectors. The encoder circuit 115 is further configured to utilize multiple samples (multiple phases $\Theta_N$) to determine an acceleration of the motor 120 and/or a speed of the motor 120.

Figure 2:
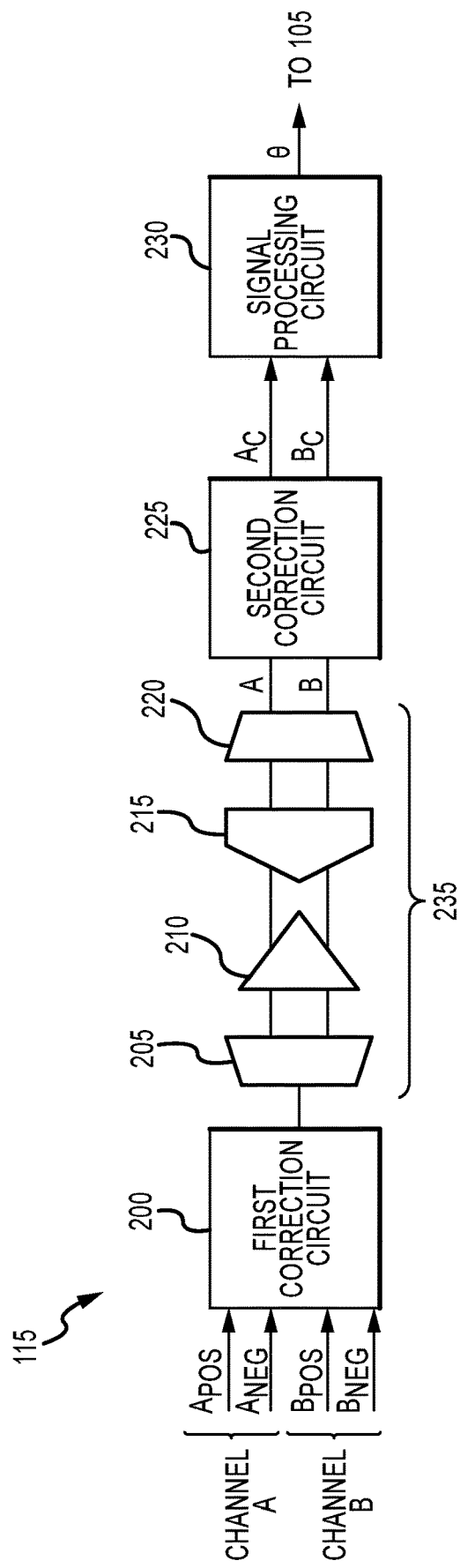
FIG. 2 is a block diagram of an encoder circuit in accordance with an exemplary embodiment of the present technology.

In operation, and referring to FIGS. 1, 2 and 5, as the motor 120 turns, encoder circuit generates the first and second signals A, B. Each signal A, B is transmitted to the first correction circuit 200 to correct the gain of each signal by applying a programmable fixed gain and further correcting the DC offset by applying a programmable fixed DC offset. Each signal A, B is transmitted to the signal conversion circuit 235, wherein the signal conversion circuit 235 digitizes the signals. The signals are then transmitted to the second correction circuit 225, wherein the second correction circuit 225 further corrects the gain by applying a dynamic gain to each signal and further correcting the DC offset by detecting peaks and valleys (maximum and minimum amplitudes) in the signals and computing the DC offset between these. The second correction circuit 225 then subtracts the DC offset from each data point transmitted from the signal conversion circuit 235. According to an exemplary embodiment, an ideal peak value may be stored in the second correction circuit 225 and utilized to compute the gain. The second correction circuit 225 may then multiply the computed gain by each data point after the DC offset has been removed.

Figure 6:
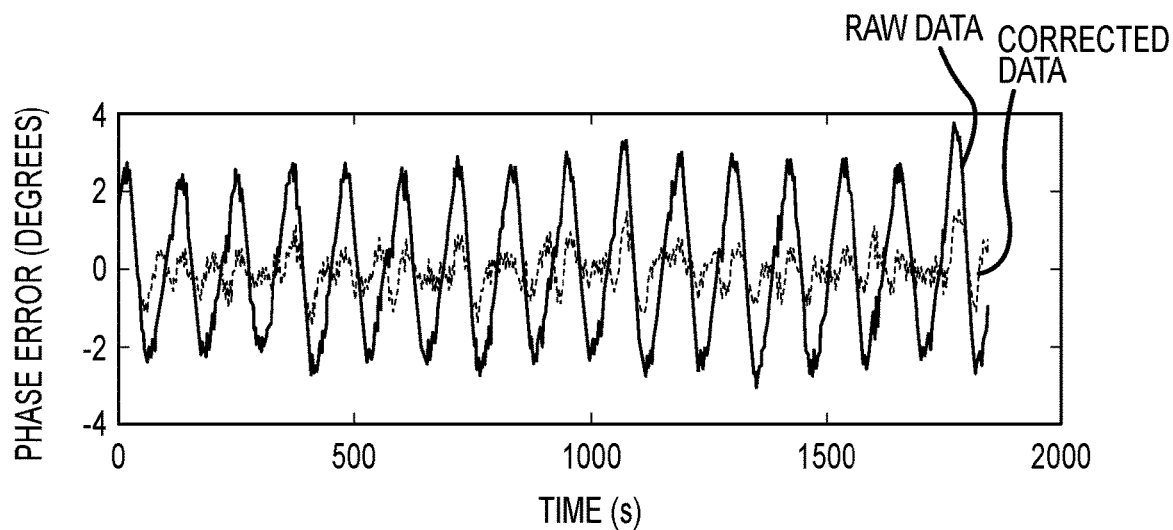
FIG. 6 is a graph illustrating a phase error over time in accordance with an exemplary embodiment of the present technology.
Figure 7:
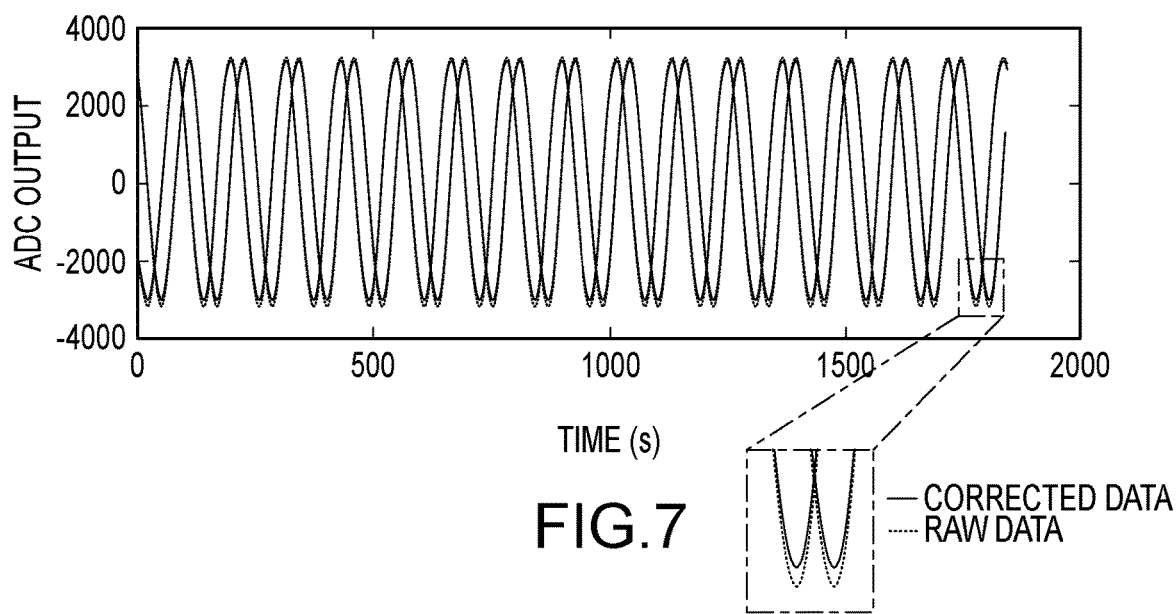
FIG. 7 is a graph illustrating an ADC output over time in accordance with an exemplary embodiment of the present technology.
Figure 8:
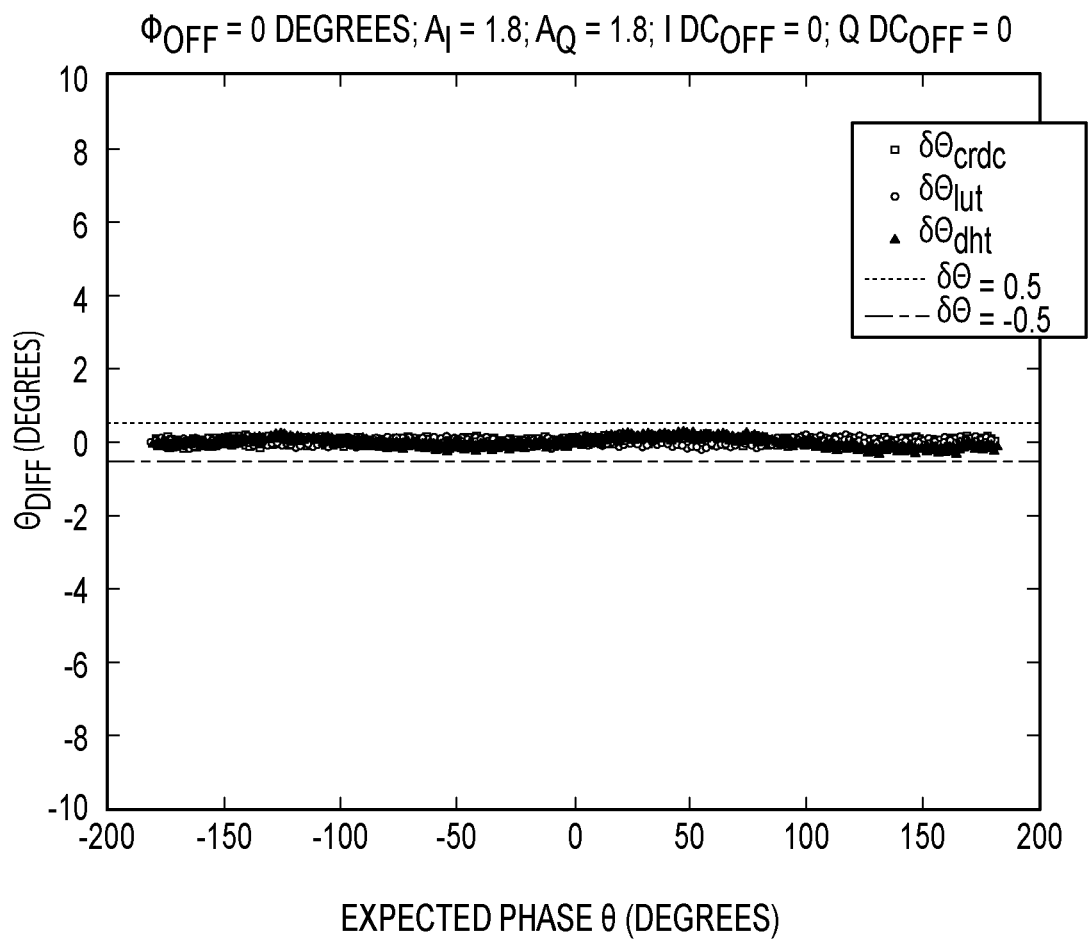
FIG. 8 is a graph of an expected phase versus comparing a calculated phase error utilizing various phase estimation methods, where there are no impairments.
Figure 9:
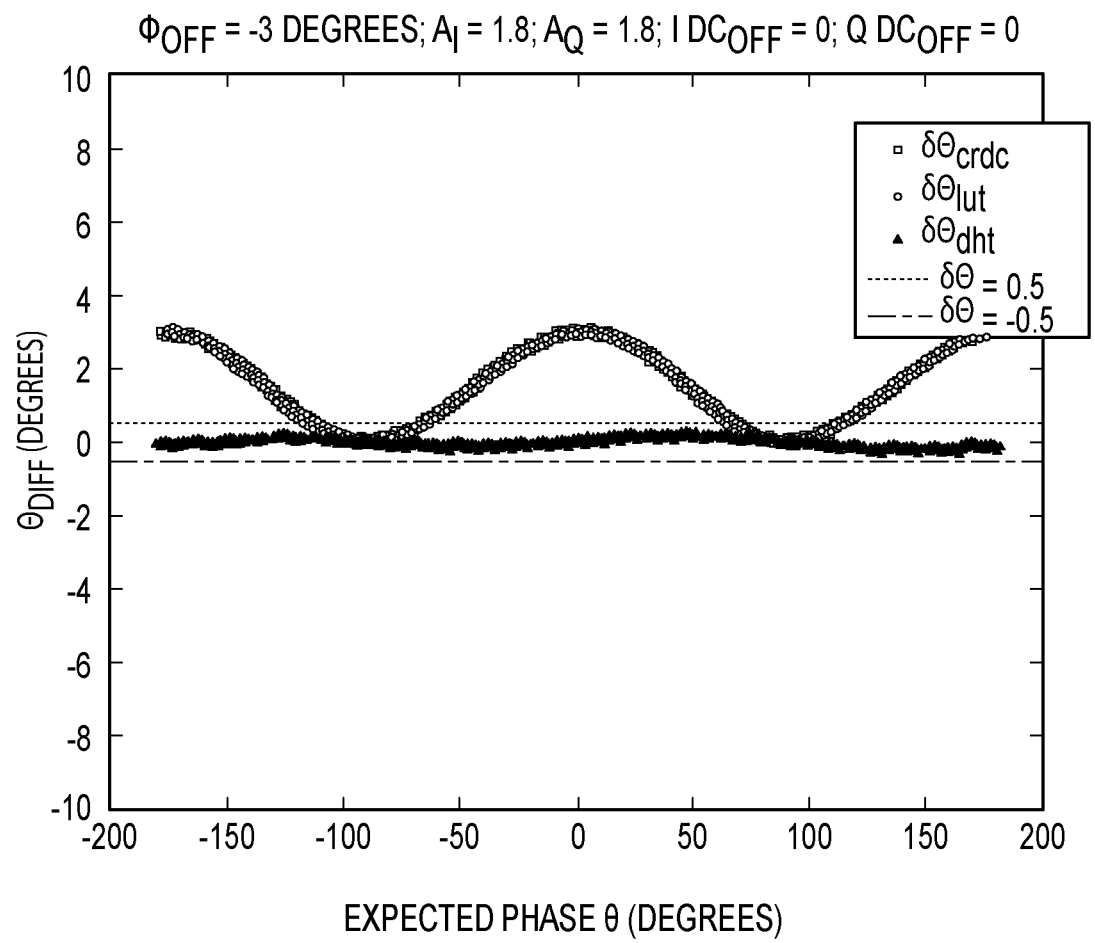
FIG. 9 is a graph of an expected phase versus a calculated phase error utilizing various phase estimation methods, in the presence a phase offset of −3 degrees.
Figure 10:
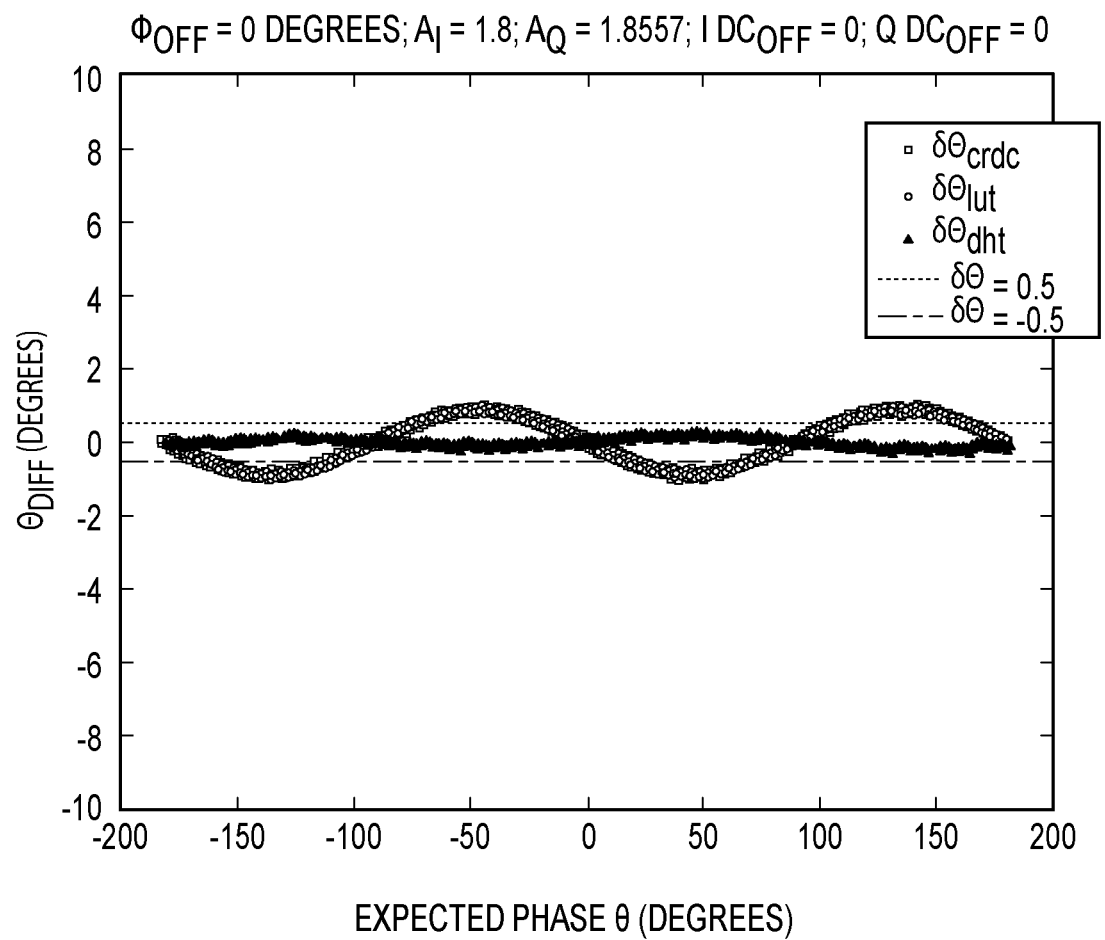
FIG. 10 is a graph of an expected phase versus comparing a calculated phase error utilizing various phase estimation methods, in the presence of a 3% amplitude mismatch.
Figure 11:
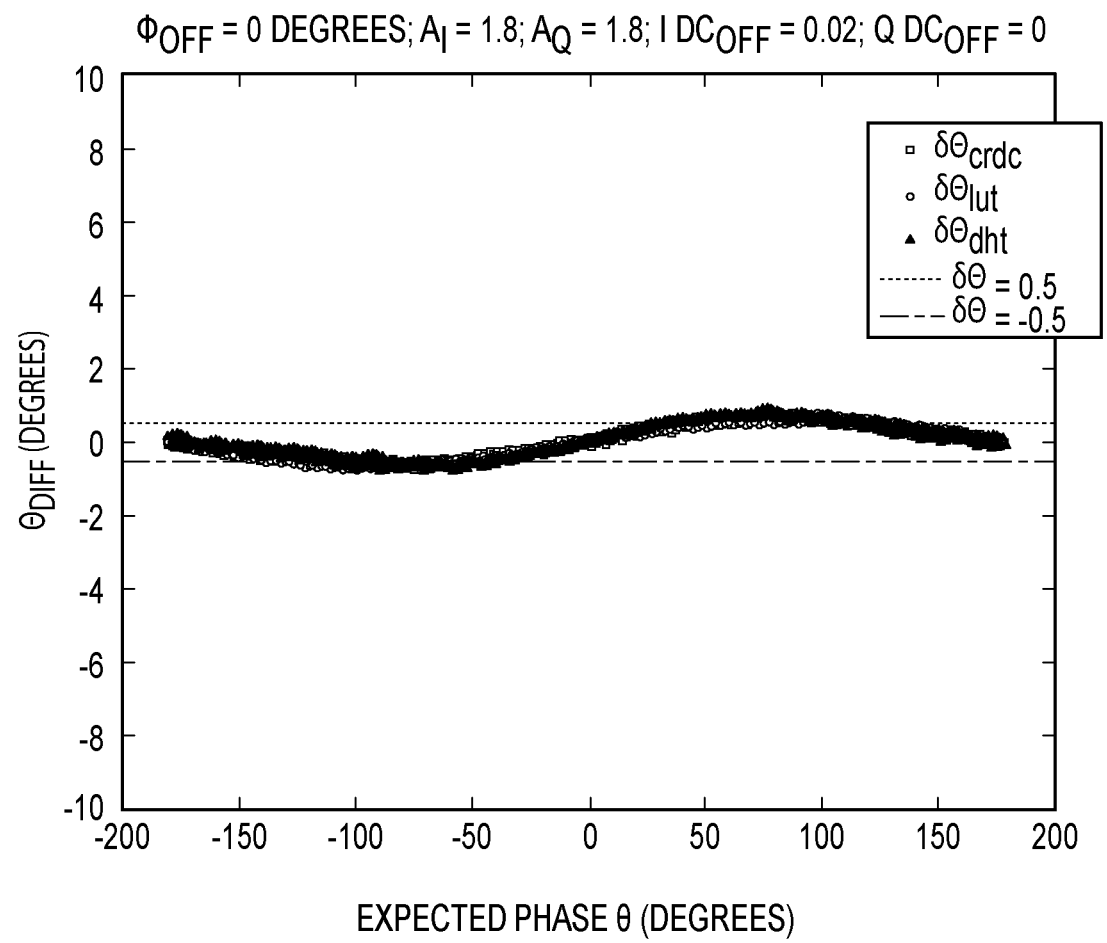
FIG. 11 is a graph of an expected phase versus comparing a calculated phase error utilizing various phase estimation methods, in the presence of a 20 mV DC offset.

Referring to FIGS. 6 and 7, post-processing and modeling results show that the signal data prior to correction (raw data) has much greater phase errors than the signal data after the various gain correction functions have been applied to the signals (FIG. 6), and the signal data prior to correction exhibits a DC offset while the corrected data does not exhibit a DC offset (FIG. 7).

Referring back to FIGS. 1, 2, and 5, and according to one operation, each signal A, B may then be transmitted to the signal processing circuit 230. Each signal A, B may be decimated, for example, the first decimator 505 may generate the first decimated signal (i.e., $I(t_D)$) according to Equation 5 above, and the second decimator 510 may generate the second decimated signal (i.e., $Q(t_D)$) according to Equation 6 above.

According to another operation, for example in a case where the motor is rotating at a low speed, such as 0.089 Hz, the motor 120 is changing direction, and/or the motor 120 is changing speed, the second correction circuit 225 may transmit the second corrected signals Ac, Bc directly to the first phase estimation circuits 540. For example, in such a case, the signal processing circuit 230 may bypass the first and second decimators 505, 510 and the first and second filters 525, 535 and transmit the Channel A and B signals directly to the first phase estimation circuit 540, wherein the first phase estimation circuit 540 computes the phase $\theta$ utilizing information from the signals on both channels A and B.

In a case where the motor 120 is rotating at a higher speed, for example in a case where the decimation value DEC is 1, the signal processing circuit 230 may transmit the first and second decimated signals $I(t_D)$, $Q(t_D)$ to the first and second filters 525, 535, respectively, as well as the first and second delay circuits 520, 530, respectively. In the present case, the first and second filters 525, 535, compute the Discrete Hilbert transform of each signal (i.e., $I'(t_D+\tau)$, $Q'(t_D+\tau)$), for example according to Equations 9 and 10 above, and the first and second delay circuits 520, 530 generate delayed signals (i.e., $I(t_D+\tau)$, $Q(t_D+\tau)$) according to Equations 7 and 8 above. The signal processing circuit 230 may then transmit the transformed signals $I'(t_D+\tau)$, $Q'(t_D+\tau)$ and the delayed signals $I(t_D+\tau)$, $Q(t_D+\tau)$ to the first and second phase estimation circuits 540, 545, respectively, where the phase estimation circuits 540, 545, compute the phase of each signal (i.e., $\Theta_A$, $\Theta_B$).

After the signal processing circuit 230 computes the phase of each signal, the signal processing circuit 230 may then generate the interpolated phase values (i.e., $\Theta_{A\_INT}$, $\Theta_{B\_INT}$), for example with the first and second interpolators 555, 560 and according to Equations 13 and 14 above. The signal processing circuit 230 may then subtract the Channel B interpolated phase $\Theta_{B\_INT}$ from the Channel A interpolated phase $\Theta_{A\_INT}$. The signal processing circuit 230 may acquire multiple phase offsets $\Phi_{OFF}$ from the Channel A and Channel B interpolated phases $\Theta_{A\_INT}$, $\Theta_{B\_INT}$ and average those samples, for example with the averaging circuit 575, to determine the phase offset $\Phi_{OFF}$.

The signal processing circuit 230 may utilize the computed phase offset (DOFF and other relevant variables to compute the phase $\theta$ (i.e., a final phase $\theta$). For example, the extrapolation circuit 580 may receive the phase offset (DOFF, the decimation value DEC, the interpolated phase from Channel A $\Theta_{A\_INT}$, and the direction signal DIR. The extrapolation circuit 580 may compute the phase $\theta$ (i.e., the final phase $\theta$) as described above. In the case where the motor 120 is rotating at a higher speed, the phase $\theta$ (i.e., the final phase $\theta$) is computed according to the Channel A signal. The signal processing circuit 230 may then transmit the phase $\theta$ (i.e., the final phase $\theta$) to the drive circuit 105, wherein the drive circuit 105 utilizes the phase $\theta$ (i.e., the final phase $\theta$) to determine the position of the motor 120, as described above, and to move the motor 120 to a desired position and/or confirm that the motor 120 is in a desired position. The drive circuit 105 may then perform various operations to synchronize the rotary position information, such as the phase $\theta$ (i.e., the final phase $\theta$) and other relevant parameters, received by the signal processing circuit 230 with other relevant variables.

Referring to FIGS. 8-11, experimental results show a phase error $\Theta_{DIFF}$ under various conditions, where the phase error $\Theta_{DIFF}$ is the difference between an expected phase $\theta$ (i.e., the phase generated when the Channel A and Channel B signals are in quadrature) and a measured (actual) phase $\theta$ according to various methods. For example, in a case of an ideal signal with no impairments (FIG. 8), the phase error $\Theta_{DIFF}$ between Channel A and Channel B signals is substantially zero.

In a case where there is an amplitude mismatch between the Channel A and Channel B signals (FIG. 10), computing the phase $\theta$ using only the CORDIC algorithm ($\delta\Theta_{crdc}$) or a look-up table ($\delta\Theta_{lut}$), results in a large phase error $\Theta_{DIFF}$. However, according to an exemplary embodiment of the present technology, when the CORDIC is paired with the DHT ($\delta\Theta_{dht}$), the phase error $\Theta_{DIFF}$ is substantially zero.

In a case where a phase offset exists between the Channel A and Channel B signals (FIG. 9), computing the phase $\theta$ using only the CORDIC algorithm or a look-up table, results in a large phase error $\Theta_{DIFF}$. However, according to an exemplary embodiment of the present technology, when the CORDIC is paired with the DHT, the phase error $\Theta_{DIFF}$ is substantially zero.

In a case where there is a 20 mV DC offset between the Channel A and Channel B signals (FIG. 11), none of the methods (CORDIC, look-up table, or CORDIC+DHT) alone are able to correct this impairment. However, according to an exemplary embodiment of the present technology, when the signals A, B are corrected with the first and second correction circuits 200, 225, the DC offsets are effectively removed prior to processing by the signal processing circuit 230 and, therefore, will have a phase error $\Theta_{DIFF}$ of substantially zero.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An integrated circuit capable of receiving a first input signal and a second input signal, comprising:
    a first filter configured to compute a first quadrature of the first input signal;
    a second filter configured to compute a second quadrature of the second input signal;
    a first phase estimation circuit coupled to an output terminal of the first filter and configured to estimate a first phase according to the first input signal and the first quadrature;
    a second phase estimation circuit coupled to an output terminal of the second filter and configured to estimate a second phase according to the second input signal and the second quadrature; and
    a phase offset circuit coupled to the output terminals of the first and second phase estimation circuits and configured to compute a phase offset based on the first and second phases.

2. The integrated circuit according to claim 1, further comprising a first correction circuit configured to:
    apply a fixed gain to a third input signal and a fourth input signal; and
    apply a coarse DC offset correction to the third and fourth input signals;
    wherein the first correction circuit generates the first and second input signals according to the third and fourth input signals.

3. The integrated circuit according to claim 1, further comprising a second correction circuit configured to:
    apply a dynamic gain to a third input signal and a fourth input signal; and
    apply a fine DC offset correction to the third and fourth input signals;
    wherein the second correction circuit generates the first and second input signals according to the third and fourth input signals.

4. The integrated circuit according to claim 3, wherein the second correction circuit comprises:
    a peak and valley detection circuit configured to compute a peak and a valley of each of the third and fourth input signals;
    an offset correction circuit coupled to the peak and valley detection circuit and configured to apply the fine DC offset correction; and
    a gain correction circuit coupled to the offset correction circuit, and configured to apply the dynamic gain according to an ideal peak signal.

5. The integrated circuit according to claim 1, further comprising a decimator configured to change a sampling rate of the first and second input signal.

6. The integrated circuit according to claim 1, wherein:
    the first and second phase estimation circuits utilize a Coordinate Rotation Digital Computer (CORDIC) algorithm to compute the first and second phases; and
    each of the first and second filters comprise Discrete Hilbert Transform filters.

7. The integrated circuit according to claim 1, further comprising:
    a first delay circuit coupled in parallel with the first filter and configured to apply a time delay to the first input signal; and
    a second delay circuit coupled in parallel with the second filter and configured to apply the time delay to the second input signal.

8. The integrated circuit according to claim 1, computing a final phase according to the phase offset, the first phase, and a frequency.

9. The integrated circuit according to claim 8, wherein the integrated circuit is further configured to compute a motor position according to the final phase.

10. A method for computing a motor position, comprising: decimating a first input signal and a second input signal; computing a first quadrature of the first signal; computing a second quadrature of the second input signal; computing a first phase according to the first quadrature; computing a second phase according to the second quadrature; computing a phase offset based on the computed first and second phases; and computing the motor position based on the phase offset, the first phase, and a frequency.

11. The method according to claim 10, further comprising applying a time delay to each of the first and second input signals.

12. The method according to claim 10, further comprising computing a frequency of the first input signal based on zero crossings and decimating the first and second input signals according to the computed frequency.

13. The method according to claim 10, further comprising removing a time delay from the phase offset.

14. A system capable of generating a first signal and a second signal, comprising:
    a motor assembly comprising:
        a motor having a motor position; and
        an optical encoder coupled to the motor and comprising:

a first correction circuit configured to:
  apply a first gain to the first and second signals;
  apply a first DC offset correction to the first and second signals;
  generate first channel data; and
  generate second channel data;
a second correction circuit coupled to an output terminal of the first correction circuit and configured to:
  apply a second gain to the first and second channel data;
  apply a second DC offset correction to the first and second channel data;
  generate corrected first channel data; and
  generate corrected second channel data;
a signal processing circuit coupled to the second correction circuit and configured to:
  compute a first quadrature of the corrected first channel data;
  compute a second quadrature of the corrected second channel data;
  estimate a first phase according to the first signal corrected first channel data and the first quadrature;
  estimate a second phase according to the corrected second channel data and the second quadrature; and
  compute a phase offset based on the first and second phases.

15. The system according to claim 14, wherein:
the first gain comprises a fixed gain; and
the second gain comprises a dynamic gain.

16. The system according to claim 14, wherein:
the first DC offset correction comprises a coarse correction; and
the second DC offset correction comprises a fine correction.

17. The system according to claim 14, wherein the optical encoder circuit further comprises a decimator coupled between the output terminal of the second correction circuit and the signal processing circuit, and configured to change a sampling rate of the first and second channel data.

18. The system according to claim 14, wherein the system is further configured to compute:
a final phase according to the phase offset, the first phase, and a frequency; and
the motor position according to the final phase.

19. The system according to claim 14, wherein the second correction circuit comprises:
a peak and valley detection circuit configured to compute a peak and a valley of each of the first and second channel data;
an offset correction circuit coupled the peak and valley detection circuit and configured to apply the second DC offset correction; and
a gain correction circuit coupled to the offset correction circuit, and configured to apply the second gain correction according to an ideal peak signal.

* * * * *

UNITED STATES PATENT AND TRADEMARK OFFICE
CERTIFICATE OF CORRECTION

PATENT NO. : 10,642,243 B2
APPLICATION NO. : 15/908931
DATED : May 5, 2020
INVENTOR(S) : Nerayanuru et al.

Page 1 of 1

It is certified that error appears in the above-identified patent and that said Letters Patent is hereby corrected as shown below:

In the Claims

Claim 14, Column 15, Line 23, please delete "first signal".

Signed and Sealed this
Ninth Day of June, 2020

Andrei Iancu
*Director of the United States Patent and Trademark Office*